United States Patent [19]

Shelly

[11] 4,251,857
[45] Feb. 17, 1981

[54] LOSS COMPENSATION REGULATION FOR AN INVERTER POWER SUPPLY

[75] Inventor: Randolph D. W. Shelly, Rosemere, Quebec, Canada

[73] Assignee: Sperry Corporation, New York, N.Y.

[21] Appl. No.: 13,355

[22] Filed: Feb. 21, 1979

[51] Int. Cl.³ .......................................... H02M 3/335
[52] U.S. Cl. .................................... 363/26; 363/124; 363/134
[58] Field of Search .................................... 363/24–26, 363/86, 97, 124, 134; 324/DIG. 1

[56] References Cited

U.S. PATENT DOCUMENTS

| | | | |
|---|---|---|---|
| 3,676,768 | 7/1972 | Morrey | 323/22 T |
| 3,742,330 | 6/1973 | Hodges et al. | 363/41 |
| 3,839,668 | 10/1974 | Black | 363/97 X |
| 4,025,862 | 5/1977 | Gautheron | 363/86 X |
| 4,034,280 | 7/1977 | Cronin et al. | 363/97 X |
| 4,061,957 | 12/1977 | Vader | 363/24 X |
| 4,126,891 | 11/1978 | Suzuki et al. | 363/26 |
| 4,150,423 | 4/1979 | Boschert | 363/97 X |

Primary Examiner—William M. Shoop
Attorney, Agent, or Firm—Kenneth T. Grace; William E. Cleaver; Marshall M. Truex

[57] ABSTRACT

An inverter power supply circuit that compensates for variations in the power supply's output voltage, which variations are due to variations in output loading, is disclosed. The input side of the circuit's DC-DC Converter-Inverter-Converter coupling transformer incorporates a compensation network having an impedance that is equivalent to the power supply's output impedance. Variations in the output loading cause corresponding proportional changes in the currents passing through the load and the compensating network. The changing current in the compensating network on the input side of the coupling transformer generates a corresponding changing voltage that is coupled, as a positive feedback, to the chopping transistor of the power supply to provide compensation for the variation in loading on the output side of the coupling transformer.

8 Claims, 2 Drawing Figures

LOSS COMPENSATION REGULATION FOR AN INVERTER POWER SUPPLY

BACKGROUND OF THE INVENTION

In the prior art it is known to provide regulated DC power to a load using an inverter power supply—see the publication "Power Supplies for Computers and Peripherals," S. Davis, Computer Design, July, 1972, Pages 55 through 65. Generally, a filtered DC input voltage is inverted to a DC signal that is bidirectionally coupled from the center tap to the end terminals of the primary winding of an output or coupling transformer via switching transistors. Control circuitry is coupled to the output winding of the coupling transformer to regulate the output voltage across the load. Additionally, current sensing circuitry on the output side of the coupling transformer may be utilized to provide overload or short circuit protection for variations in loading—see the publication "Here Are More Protective Circuits," A. Annunziato, Electronic Design 10, May 13, 1971, Pages 64 through 67, with particular reference to FIG. 12. However, in such a configuration the control circuitry is not isolated from the load on the output side of the coupling transformer.

SUMMARY OF THE INVENTION

In the present invention the filtered DC input voltage is inverted to a DC signal that is bidirectionally coupled from the center tap to the end terminals of the primary winding of a coupling transformer via switching transformers. Control circuitry on the input side of the coupling transformer includes a current sensing circuit having an impedance that is equivalent to the power supply's output impedance at the output side of the coupling transformer. Current flowing through the current sensing circuit generates a corresponding voltage that is coupled to a constant-frequency pulse-width-modulation controller. Changes in the sensed signal provide a compensating change in the output of the pulse-width-modulation controller, which, in turn, controls a chopping transistor. The chopping transistor, in turn, drives the center tap of the primary winding of the coupling transformer under control of the switching transistors which are driven at a constant pulse width and switching frequency. Thus, the control function is completely isolated from the load.

DESCRIPTION OF THE PREFERRED EMBODIMENT

In the inverter power supply of the present invention, the need for a current or voltage feedback from the output side to the input side of the coupling transformer—see the publication "Monitor Both Voltage and Current Levels to Protect Your Power Supply and Load," R. Mammano, Electronic Design 25, Dec. 6, 1978, Pages 96 through 103, and "Analog-Digital Transistor Switching Regulator Controller," R. Calvo, et al, IBM Technical Disclosure Bulletin, Volume 17, No. 9, February, 1976, Pages 2666–2667—is obviated by the use of a current sensing circuit on the input side of the coupling transformer. The power supply of the present invention is divided into two power sections: the first, a DC-DC Copper-Converter 10, converts a high voltage, unregulated DC voltage $V_{IN}$ to a lower voltage, regulated DC; the second, a fixed duty cycle, DC-DC Inverter-Converter 12, converts the regulated DC output from the chopper to a semi-regulated (not regulated with respect to load variations) DC output. The present invention provides a current sensing circuit 14 on the input side of the coupling transformer $T_1$ thus obviating the need for a current or voltage feedback from the output side to the input side of the coupling transformer $T_1$.

Figure 2:
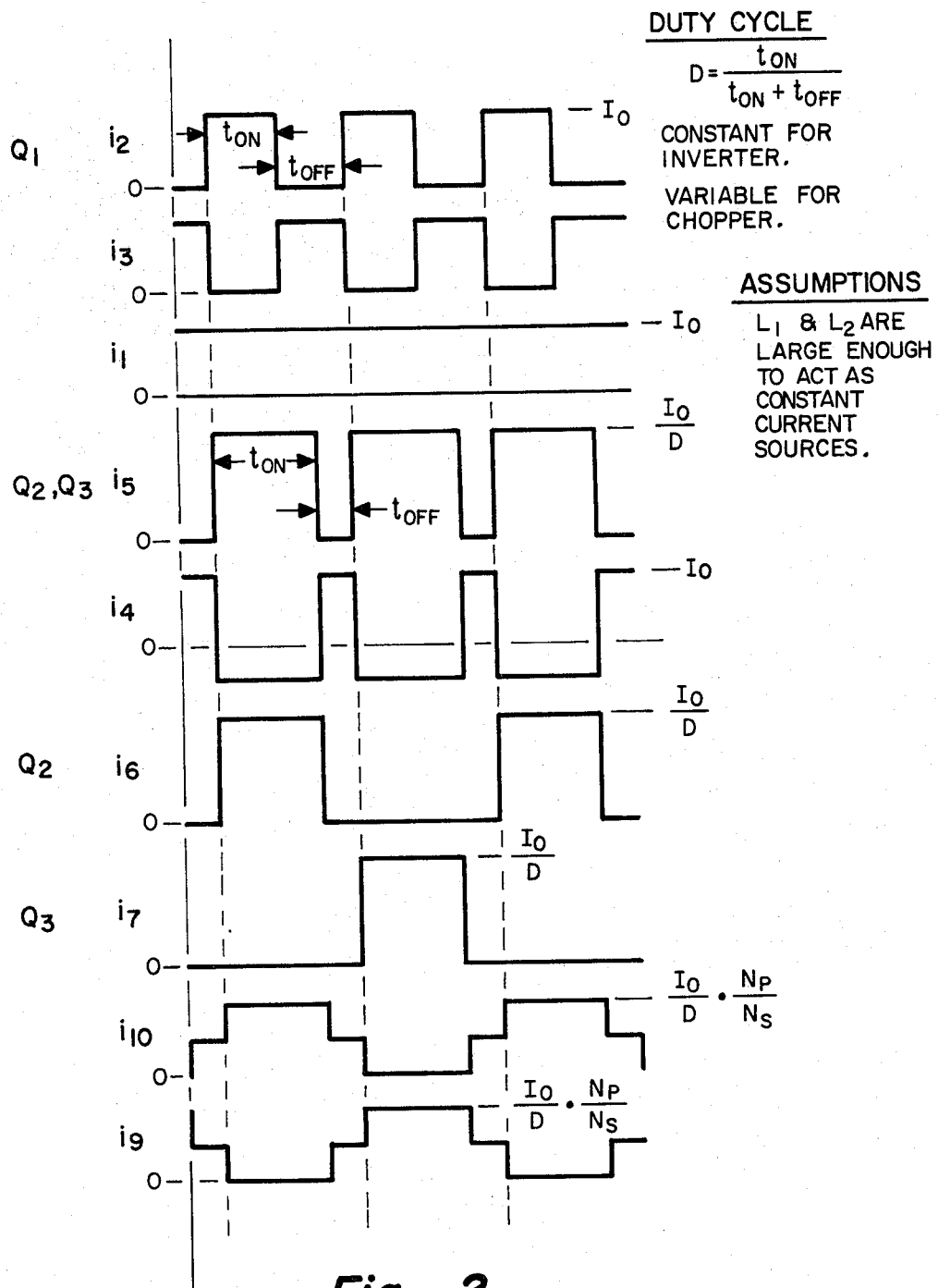
FIG. 2 is an illustration of the timing diagram associated with the signal wave shapes associated with the inverter power supply of FIG. 1.

With particular reference to the timing diagram of the current signal waveforms of FIG. 2, the current $i_1$, flowing through inductor $L_1$, is of a constant DC level and is proportional to the output load current $i_8$ flowing through the output load represented by resistor $R_{OUT}$. Inductors $L_1$ and $L_2$ are made large enough such that the currents flowing through them, $i_1$ and $i_8$, can be considered to be at constant DC levels.

Current sensing circuit 14, consisting of the bridge network of resistors $R_1$, $R_2$, $R_3$ and diode $CR_2$, is designed to simulate the losses that are encountered by the current signals $i_9$ and $i_{10}$ that bidirectionally flow out of the ends of the center tapped secondary winding of coupling transformer $T_1$ to flow through the load $R_{OUT}$, $$i_8 = i_9 + i_{10}.$$

The current signals $i_6$ and $i_7$ that flow through switching transistors $Q_2$ and $Q_3$, respectively, are also proportional to current signals $i_9$ and $i_{10}$, respectively, $$i_5 = i_6 + i_7.$$

Resistor $R_3$ simulates resistive or linear losses while diode $CR_2$ simulates non-linear losses—such as those generated by output rectifier diodes $CR_3$ and $CR_4$. Resistors $R_1$ and $R_2$ are used to adjust the proportions of the signals that are fed back through summing network 16, operational amplifier 18 and constant-frequency pulse-width-modulation controller 20.

Controller 20, under control of the variable signals that are generated by current sensing circuit 14, pulse-width-modulates the signal that is coupled to the base of chopper transistor $Q_1$, the time ON, $t_{ON}$, and time OFF, $t_{OFF}$ of which, in turn determines variable duty cycle $$D_{Q1} = \frac{t_{ON}}{t_{ON} + t_{OFF}}$$

of the DC-DC Chopper-Converter 10.

In contrast, the constant frequency, constant pulse-width of the switching signals that are coupled to the base electrodes of switching transistors $Q_2$ and $Q_3$ generate the constant frequency, constant pulse-width, but variable amplitude due to the variable duty cycle $D_{Q1}$ of chopper transistor $Q_1$, current signals $i_6$ and $i_7$, which, in turn, provide the variable amplitude output current signal $i_8$, where $$i_8 = i_9 + i_{10}.$$

The output current signal $i_8$ is of an amplitude that is a function of the turns ratio of the number of turns $N_P$ on the input side—primary winding—of coupling transformer $T_1$ to the number of turns $N_S$ on the output side—secondary winding—of coupling transformer $T_1$ $$N_P/N_S$$

and is a function of the variable duty cycle $D_{Q1}$ of the chopper transistor $Q_1$ and the constant amplitude $I_O$ of the current signal $i_1$ $$\frac{I_0}{D_{Q1}}.$$
$$i_8 = \frac{I_0}{D_{Q1}} \times \frac{N_p}{N_S}.$$

In operation, the current $i_1$, as it passes through current sensing network 14, generates across resistor $R_3$ and diode $CR_2$ voltage signals that are proportional to the linear and non-linear losses, respectively, in the DC-DC Inverter-Converter 12, of current signal $i_8$. Resistors $R_1$ and $R_2$ adjust the relative proportions of those signals and the level of the resulting total signal is of a sufficiently low level to be an insignificant proportion of the chopper voltage $v_1$ but a significant proportion of the total reference signal $v_r$. As the output current $i_8$ increases with an increase in the load $R_{OUT}$, the chopper current signal $i_1$ increases proportionately increasing the compensation signal $v_c$. The compensation signal $v_c$ is added to the reference signal $v_r$ causing the chopper output signal $v_1$ to increase sufficiently to offset the increased voltage drop losses developed in the DC-DC Inverter-Converter 12. Resistors $R_1$ and $R_2$ are adjusted such that the voltage appearing at the load (not necessarily the voltage at the power supply output at terminals 30 and 32) is regulated.

The compensation signal developed at $R_1$ and $R_2$ is of the form $$v_c = r_x k_2 (1 - e^{-k_1 i_1}) + r_y R_1 i_1$$

where $r_x$ and $r_y$ are the adjustment ratios of resistors $R_1$ and $R_2$, respectively, and the constants $k_1$ and $k_2$ are positive constants. Operational amplifier 18 in combination with the summing network 16 is a compensated error amplifier. The pulse-width-modulated controller 20 is a circuit that converts an analog DC signal to a rectangular wave, and is, in effect, a voltage-to-duty cycle converter.

Figure 1:
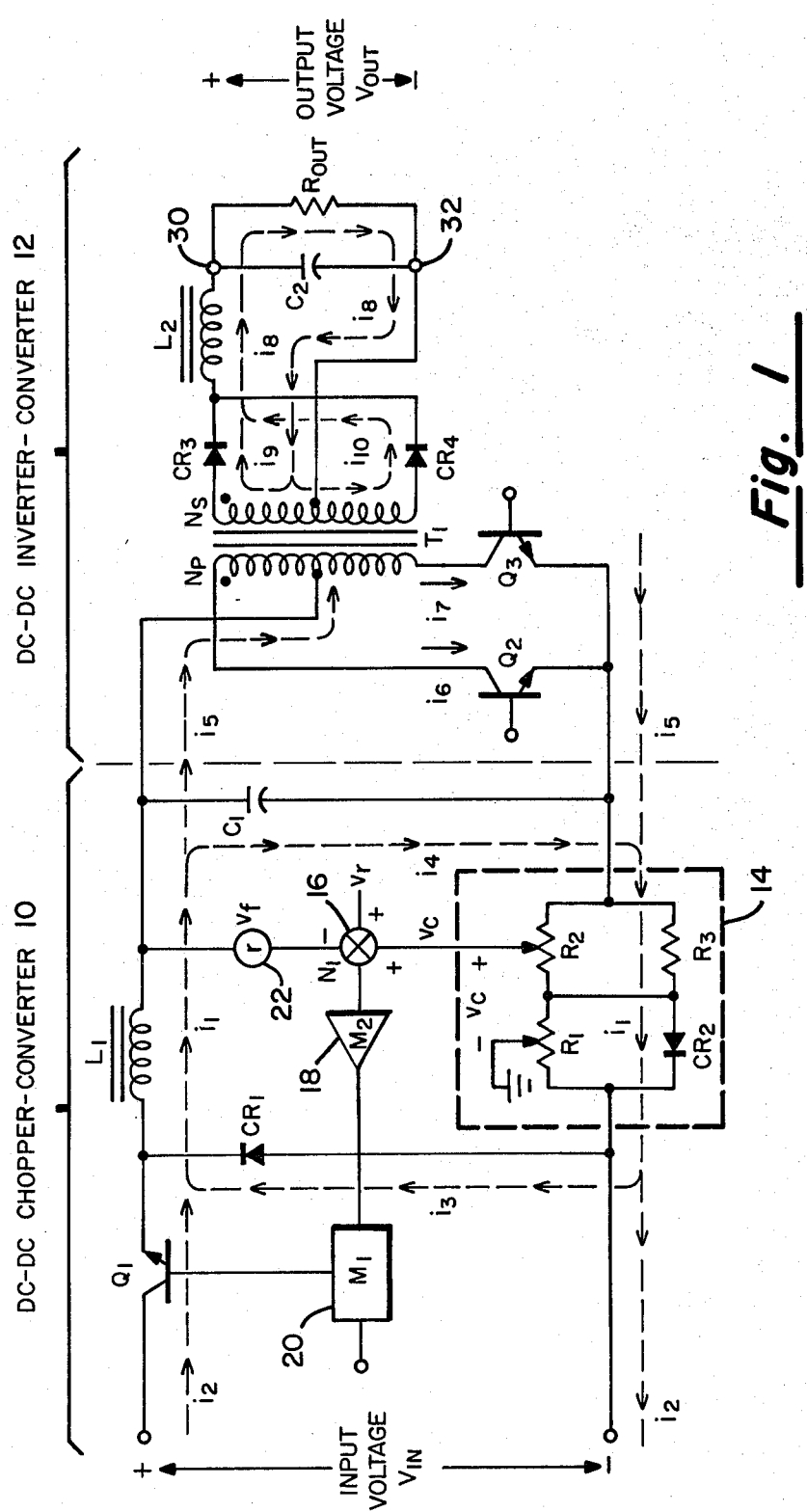
FIG. 1 is an illustration of an inverter power supply in which the loss compensation regulation of the present invention is incorporated.

As illustrated in FIG. 2, switching transistors $Q_2$ and $Q_3$ are driven alternately from a fixed frequency, fixed duty cycle control circuit which also synchronizes the frequency of operation of pulse-width-modulation controller 20 for synchronizing the base drive of transistors $Q_1$, $Q_2$ and $Q_3$. With respect to the other elements of FIG. 1: the function of operational amplifier 18 and node $N_1$ may be obtained by a 741 operational amplifier and a resistor-capacitor network; controller 20 could be made up of several digital ICs and a 555 timer, or, alternatively, the function of controller 20, operational amplifier 18 and node $N_1$ could be performed by a single regulating pulse-width-modulation controller IC such as the SG1524 Series; element 22 is the standard notation for a ratio device such as a resistor divider or potentiometer where $v_f$ is the feedback voltage ratioed down by element 22, i.e., $$v_f = r v_1.$$

What is claimed is:

1. An inverter power supply incorporating loss compensation, comprising:
    variable loading means;
    transformer means having a primary winding means and a secondary winding means;
    coupling means for coupling said variable loading means to said transformer means' secondary winding means;
    means including chopping means for generating a primary current signal;
    current sampling circuit means for sampling said primary current signal wherein said current sampling circuit means is comprised of;
    serially intercoupled first and second resistor means;
    serially intercoupled first diode means and third resistor means;
    means coupling the open ends of said first resistor means and said first diode means to the second terminal means of said current sampling circuit means;
    means coupling the open ends of said second resistor means and said third resistor means to the second terminal means of said current sampling means; and,
    means coupling the intercoupled ends of said first resistor means and said second resistor means to the intercoupled ends of said first diode means and said third resistor means;
    means including switching means for bidirectionally coupling said primary current signal to said transformer means' primary winding means; and,
    controller means responsively coupled to said current sampling circuit means varying the duty cycle of said chopping means for compensating for variations in said variable loading means.

2. An inverter power supply incorporating loss compensation, comprising:
    variable loading means;
    transformer means having a primary winding means and a secondary winding means;
    coupling means for coupling said variable loading means to said transformer means' secondary winding means, said coupling means including unidirectional current controlling means coupled across said transformer means' secondary winding means for producing a known non-linear output impedance of said inverter power supply;
    means including chopping means for generating a primary current signal;
    current sampling circuit means for sampling said primary current signal, said current sampling means including non-linear impedance means having an impedance that is representative of said known non-linear output impedance of said inverter power supply;
    means including switching means for bidirectionally coupling said primary signal to said transformer means' primary winding means; and,
    pulse-width-modulator controller means responsively coupled to said current sampling circuit means varying the duty cycle of said chopping means for compensating for variations in said variable loading means.

3. An inverter power supply incorporating loss compensation, comprising:

transformer means having a center tapped primary winding means and a secondary winding means;
means including chopping means coupled to the center tap of said transformer means' primary winding means;
current sampling means wherein said current sampling circuit means is comprised of:
   serially intercoupled first and second resistor means;
   serially intercoupled first diode means and third resistor means;
   means coupling the open ends of said first resistor means and said first diode means to the second terminal means of said current sampling circuit means;
   means coupling the open ends of said second resistor means and said third resistor means to the second terminal means of said current sampling circuit means; and,
   means coupling the intercoupled ends of said first resistor means and said second resistor means to the intercoupled ends of said first diode means and said third resistor means;
   switching means for alternately coupling said current sampling means to the first and second ends of said transformer means' primary winding means; and,
   controller means intermediate said current sampling means and said chopping means for varying the duty cycle of said chopping means to compensate for variations in the current flow through said current sampling means.

4. An inverter power supply incorporating loss compensation, comprising:
transformer means having a center tapped primary winding means and a secondary winding means;
means including chopping means coupled to the center tap of said transformer means' primary winding means;
current sampling means;
switching means for alternately coupling said current sampling means to the first and second ends of said transformer means' primary winding means;
controller means intermediate said current sampling means and said chopping means for varying the duty cycle of said chopping means to compensate for variations in the current flow through said current sampling means;
uni-directional current controlling means coupled to said transformer means' secondary winding means for producing a known non-linear output impedance of said inverter power supply; and,
said current sampling means, including non-linear impedance means, providing an impedance that is representative of the non-linear output impedance of said inverter power supply.

5. An inverter power supply incorporating loss compensation, comprising:
transformer means having a primary winding means and a secondary winding means;
impedance means coupled to said transformer means' secondary winding means for producing a non-linear output impedance of said inverter power supply;
signal means for coupling a primary current signal to said transformer means' primary winding means;
current sampling means including non-linear impedance means for providing an impedance that is representative of said non-linear output impedance of said inverter power supply;
means for coupling said current sampling means to said transformer means' primary winding means; and,
controller means, coupled intermediate said current sampling means and said signal means, controlling said signal means for compensating for variations in the current flow through said current sampling means.

6. An inverter power supply incorporating loss compensation, comprising:
transformer means having a primary winding means and a secondary winding means;
means coupled to said transformer means' secondary winding means for producing a non-linear output impedance of said inverter power supply;
means including chopping means coupled to said transformer means' primary winding means;
current sampling means having first, second and third terminals and including non-linear impedance means for providing an impedance that is representative of the non-linear output impedance of said inverter power supply;
switching means for alternately coupling the first terminal of said current sampling means to the first and second ends of said transformer means' primary winding means; and,
controller means, intermediate the third terminal of said current sampling means and said chopping means, varying the duty cycle of said chopping means for compensating for variations in the current flow through said current sampling means.

7. The inverter power supply of claim 6 wherein said current sampling means is comprised of:
means serially intercoupling first and second resistor means;
means serially intercoupling said non-linear impedance means and third resistor means;
means coupling the open ends of said first resistor means and said non-linear impedance means to the second terminal of said current sampling means;
means coupling the open ends of said second resistor means and said third resistor means to the second terminal of said current sampling means; and,
means coupling the intercoupled ends of said first resistor means and said second resistor means to the intercoupled ends of said non-linear impedance means and said third resistor means.

8. An inverter power supply incorporating loss compensation, comprising:
first and second input terminal means for receiving a DC input voltage $V_{IN}$ that is to be regulated to provide a regulated DC output voltage $V_{OUT}$ at first and second output terminal means;
transformer means having a center tapped primary winding means and a secondary winding means;
means including uni-directional current controlling means coupling said transformer means' secondary winding means to said first and second output terminal means for producing a known non-linear output impedance of said inverter power supply;
means including chopping means for coupling said first input terminal means to the center tap of the primary winding means of said transformer means;
current sampling means having first, second and third terminal means, said current sampling means including non-linear impedance means having an impedance that is representative of said known non-linear output impedance of said inverter power supply;

means for coupling the first terminal means of said current sampling means to said second input terminal means;

first and second switching means for alternately coupling the second terminal means of said current sampling means to the first and second terminals, respectively, of the primary winding means of said transformer means;

variable loading means coupled across said first and second output terminal means; and, means coupling the third terminal means of said current sampling means to said chopping means varying the duty cycle of said chopping means and varying the output of said chopping means for compensating for variations in said output voltage $V_{OUT}$ due to variations in said variable load means.

* * * * *